(12) United States Patent
Bacon

(10) Patent No.: US 10,988,963 B2
(45) Date of Patent: Apr. 27, 2021

(54) DOOR LATCH ASSEMBLY

(71) Applicant: BAUER PRODUCTS, INC., Grand Rapids, MI (US)

(72) Inventor: Bruce C. Bacon, Rockford, MI (US)

(73) Assignee: BAUER PRODUCTS, INC., Grand Rapids, MI (US)

( * ) Notice: Subject to any disclaimer, the term of this patent is extended or adjusted under 35 U.S.C. 154(b) by 678 days.

(21) Appl. No.: 15/798,008

(22) Filed: Oct. 30, 2017

(65) Prior Publication Data

US 2019/0128030 A1  May 2, 2019

(51) Int. Cl.

| *E05C 1/16* | (2006.01) |
| *E05C 7/02* | (2006.01) |
| *E05B 9/02* | (2006.01) |
| *E05B 15/04* | (2006.01) |
| *E06B 7/32* | (2006.01) |
| *E06B 9/52* | (2006.01) |
| *E05B 83/44* | (2014.01) |
| *B60J 5/04* | (2006.01) |

(52) U.S. Cl.
CPC .................. *E05C 7/02* (2013.01); *E05B 9/02* (2013.01); *E05B 15/04* (2013.01); *E05C 1/16* (2013.01); *E06B 7/32* (2013.01); *E06B 9/52* (2013.01); *B60J 5/049* (2013.01); *E05B 2015/0437* (2013.01); *E05Y 2900/512* (2013.01); *Y10T 292/0964* (2015.04); *Y10T 292/0969* (2015.04); *Y10T 292/0977* (2015.04)

(58) Field of Classification Search
CPC ........... Y10T 292/096; Y10T 292/0964; Y10T 292/0969; Y10T 292/0971; Y10T 292/0977; Y10T 292/0997; Y10T 292/1016; Y10T 292/06; Y10S 292/29; E05C 1/16
USPC .................................................. 292/163, 169
See application file for complete search history.

(56) References Cited

U.S. PATENT DOCUMENTS

| 233,711 | A | * | 10/1880 | Spencer | .................... | E05C 1/14 |
| | | | | | | 292/173 |
| 315,205 | A | * | 4/1885 | Young | ..................... | E05B 9/084 |
| | | | | | | 70/370 |
| 412,189 | A | * | 10/1889 | Kingsland | ............... | E05B 85/22 |
| | | | | | | 292/169 |
| 927,442 | A | * | 7/1909 | Arens | ..................... | E05B 9/002 |
| | | | | | | 70/450 |

(Continued)

FOREIGN PATENT DOCUMENTS

| DE | 336129 C | * | 4/1921 | ............... E05C 1/16 |
| DE | 1078007 B | * | 3/1960 | ............... E05C 1/16 |

(Continued)

*Primary Examiner* — Carlos Lugo
(74) *Attorney, Agent, or Firm* — Price Heneveld LLP

(57) ABSTRACT

A door latch assembly includes a housing, an inside and outside handle operably coupled with the housing, and a latch plunger. A latch cam is operably coupled with the inside and outside handles, and the latch cam further includes a crank arm slidably disposed against an inclined surface of a plunger leg operably coupled to the latch plunger. A biasing member urges the latch plunger to an extended position, wherein rotation of the inside or outside door latch handle in a first direction rotates the crank arm of the latch cam and displaces the plunger leg of the latch plunger and the latch plunger to a retracted position against the urging of the biasing member.

21 Claims, 8 Drawing Sheets

(56) References Cited

U.S. PATENT DOCUMENTS

| | | | | |
|---|---|---|---|---|
| 1,280,993 | A | * | 10/1918 | Hammer ............ E05B 17/2088 292/159 |
| 1,579,565 | A | * | 4/1926 | Osbeck ................ E05B 65/005 292/332 |
| 1,654,221 | A | * | 12/1927 | Kline ...................... E05B 63/06 292/37 |
| 2,253,257 | A | | 8/1941 | Wellman |
| 2,454,145 | A | * | 11/1948 | Erkkila .................... E05B 9/00 70/448 |
| 2,673,109 | A | | 3/1954 | Frost |
| 2,899,819 | A | * | 8/1959 | Rolph ................... E05B 55/005 70/476 |
| 3,774,420 | A | * | 11/1973 | Orr ..................... E05B 17/2088 70/104 |
| 4,096,719 | A | * | 6/1978 | Tranberg .................. E05B 9/02 70/450 |
| 4,136,540 | A | * | 1/1979 | Coralli ................ E05B 63/0017 292/142 |
| 4,932,693 | A | * | 6/1990 | Schwartz .................. E05B 9/02 16/299 |
| 5,626,374 | A | * | 5/1997 | Kim ........................ E05C 1/145 292/137 |
| 5,690,372 | A | * | 11/1997 | Jans ................... E05B 63/0021 292/169 |
| 6,009,932 | A | | 1/2000 | Smith |
| 6,067,823 | A | * | 5/2000 | Ostergren ........... E05B 15/0013 70/210 |
| 6,282,929 | B1 | * | 9/2001 | Eller ........................ E05C 9/02 70/109 |
| 6,309,008 | B1 | | 10/2001 | Bacon |
| 6,685,240 | B2 | | 2/2004 | Bacon |
| 6,701,761 | B1 | | 3/2004 | Chang et al. |
| 6,739,162 | B1 | * | 5/2004 | Kondratuk ................ E05B 9/02 292/140 |
| 7,198,090 | B1 | | 4/2007 | Kershaw |
| 7,213,426 | B2 | * | 5/2007 | Qing ................... E05B 17/2053 292/139 |
| 7,410,194 | B2 | * | 8/2008 | Chen ........................ E05C 1/14 292/37 |
| 8,186,191 | B2 | | 5/2012 | Bacon |
| 8,347,667 | B2 | | 1/2013 | Bacon |
| 8,393,187 | B2 | | 3/2013 | Bacon |
| 8,424,931 | B2 | * | 4/2013 | Chang ................. G11B 33/123 292/137 |
| 8,534,718 | B2 | * | 9/2013 | Loret de Mola ......... E05B 5/00 292/165 |
| 8,621,901 | B2 | | 1/2014 | Bacon |
| 8,794,683 | B2 | * | 8/2014 | Wysong .................. E05B 83/44 292/1 |
| 8,960,733 | B1 | | 2/2015 | Smith |
| 9,085,919 | B2 | | 7/2015 | Bacon |
| 9,260,129 | B2 | | 2/2016 | Thompson |
| 9,540,853 | B2 | | 1/2017 | Pickar et al. |
| 2015/0279137 | A1 | | 10/2015 | Bacon |

FOREIGN PATENT DOCUMENTS

| | | | | |
|---|---|---|---|---|
| GB | 443659 | A | * | 3/1936 ............... E05C 1/16 |
| GB | 626186 | A | * | 7/1949 ............... E05C 1/16 |
| GB | 2358667 | | * | 1/2001 |

* cited by examiner

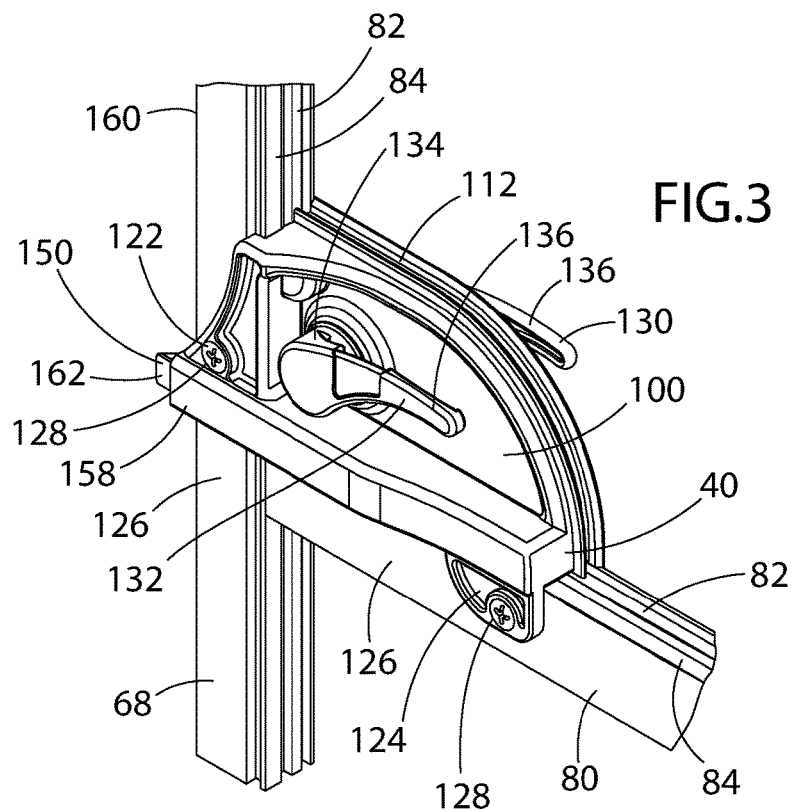
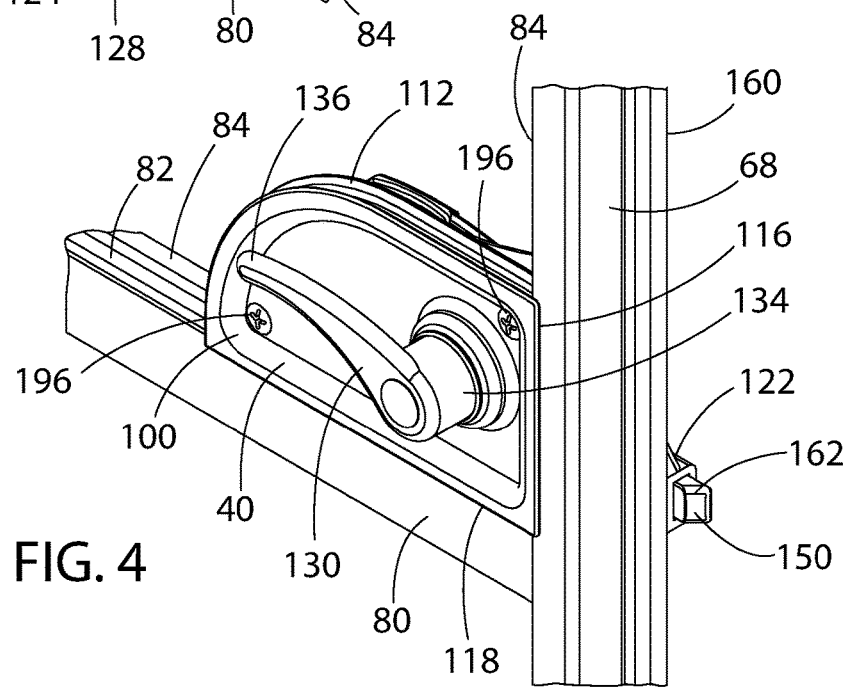

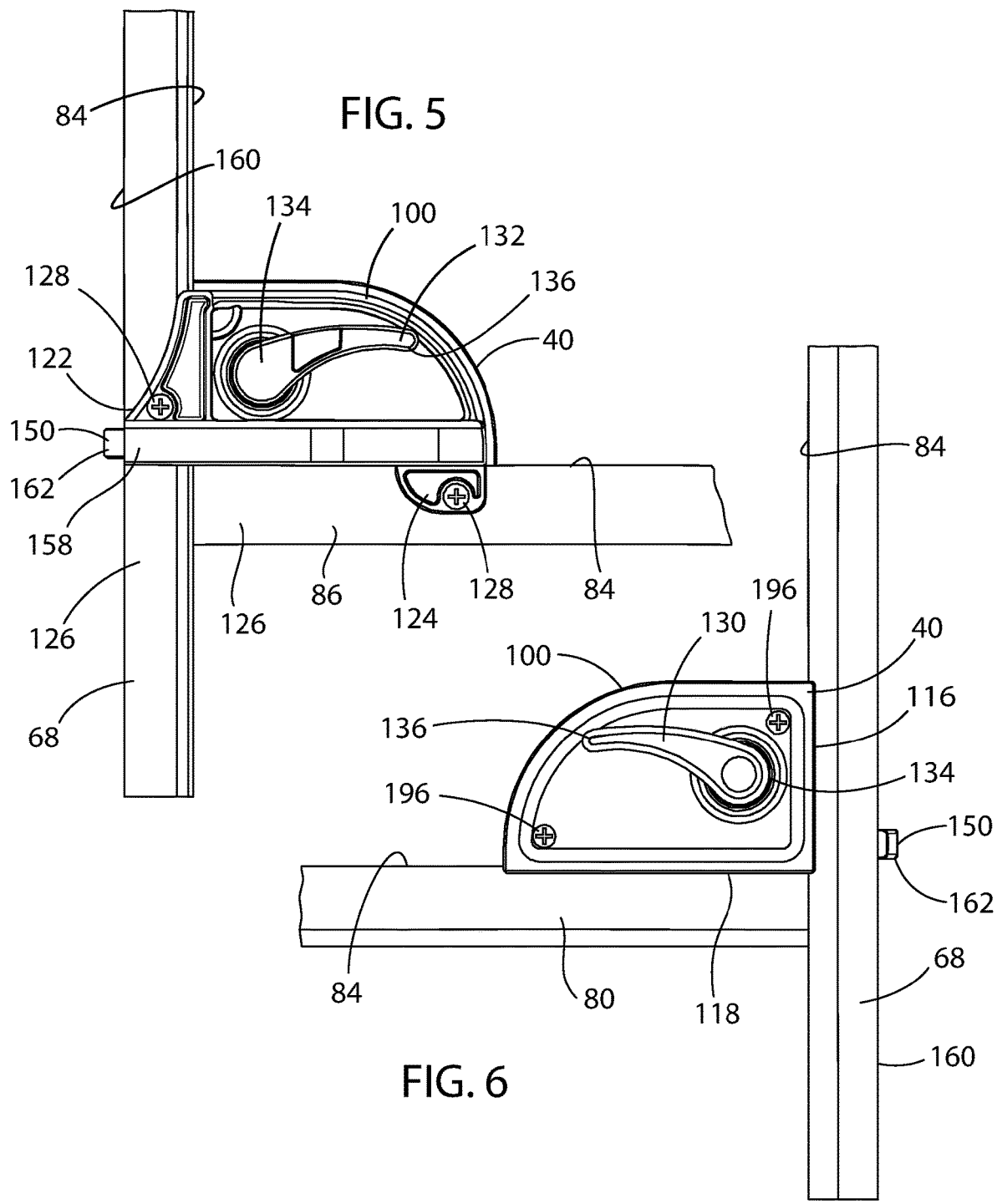

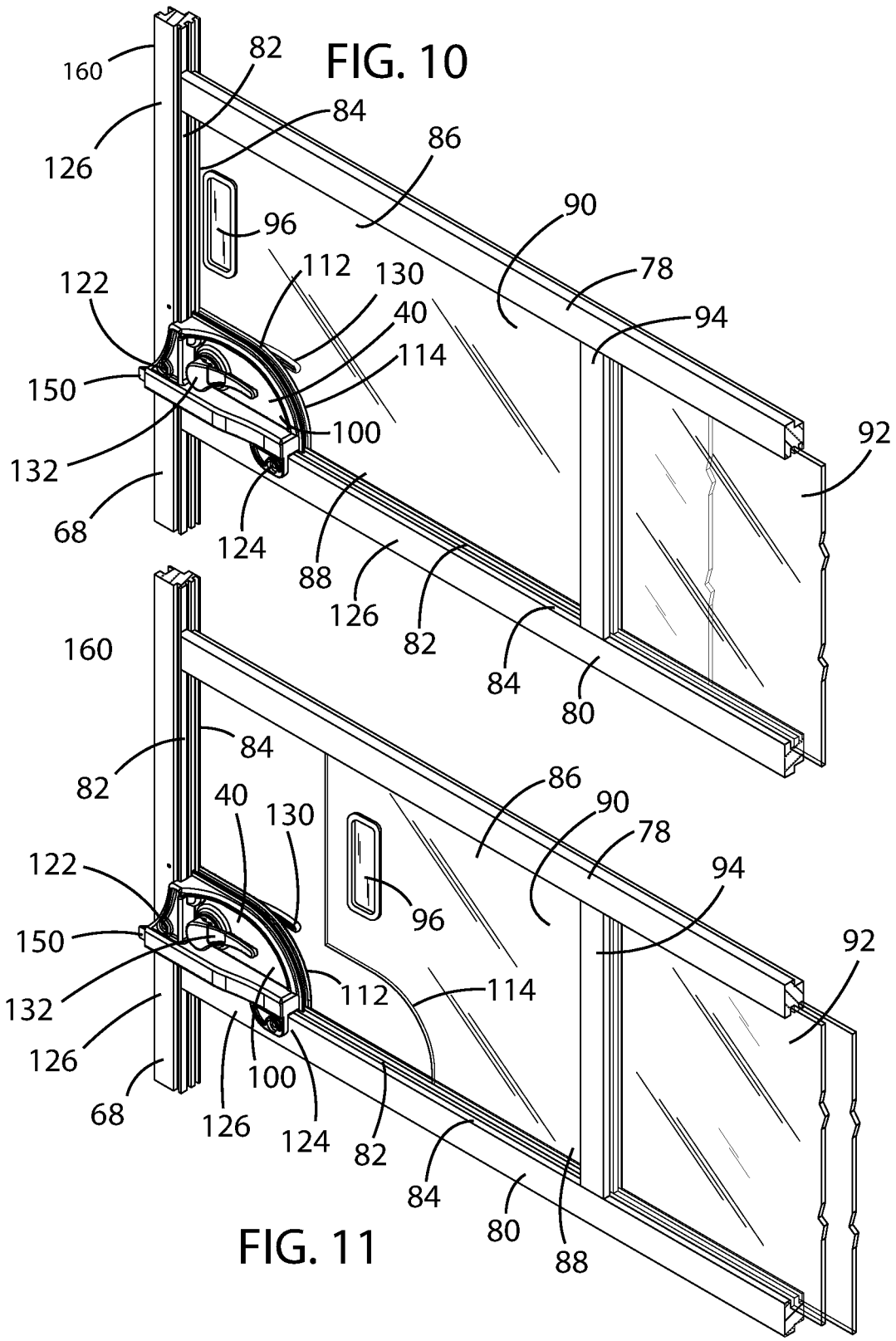

DOOR LATCH ASSEMBLY

FIELD OF THE INVENTION

The present disclosure relates to lock assemblies for movable closures and the like, and, in particular, to a lock assembly for a recreational vehicle inner screen door that can be actuated from both the interior and exterior of the recreational vehicle.

BACKGROUND OF THE INVENTION

Egress/ingress doors for motorized vehicles and trailers, particularly those adapted for use with recreational vehicles, commonly employ a combination door assembly having an exterior door detachably coupled with an inner screen door. The exterior door provides protection against the elements and otherwise encloses the recreational vehicle, while the inner screen door assembly provides ventilation to the interior of the recreational vehicle when the exterior door is placed in an open condition. The inner screen door also provides a barrier against unwelcome callers, such as insects and the like. Both the exterior door and the inner screen door may pivot about a common set of hinges along one side thereof and may be latched to an inner doorjamb along an opposite side thereof.

Typically, the inner screen door is provided with an exterior lever-type latch on its exterior surface. The exterior lever-type latch may be pivotally mounted within a housing attached to the exterior surface the inner screen door, whereby rotating an exterior lever-type latch handle causes a latch pawl on an opposite end thereof to move out of engagement with an inner screen door latch striker assembly mounted on the inner doorjamb, and thereby unlatch the inner screen door. An inner screen door retention member is commonly provided on an interior surface of the exterior door that engages the exterior lever-type latch handle to maintain the latch assembly of the inner screen door in the unlatched position, while also coupling the inner screen door to the exterior door so as to allow operation of the combination door assembly as a single door unit.

One of the shortcomings of such combination door assemblies is access to the latch assembly of the inner screen door, particularly from the interior of the recreational vehicle. A solution heretofore has been the use of a slidable panel disposed proximate the exterior lever-type latch handle. The slidable panel may be supported by and slidable along a horizontal cross frame member extending between two side frame members of the inner screen door. The slidable panel, which extends only a portion of the width of the inner screen door, is slidable between an open position and a closed position. When the slidable panel is in the open position, access to the exterior lever-type latch handle from the interior of the recreational vehicle is possible, and the inner screen door may be unlatched to allow egress from the recreational vehicle. When the slidable panel is in the closed position, the interior of the recreational vehicle is again protected against unwelcome callers. However, during operation of the exterior lever type latch handle, the slidable panel must be placed in open position and thereby expose the recreational vehicle to such unwelcome callers. Hence, a handle accessible from the interior of the recreational vehicle without operation of a slidable panel would be advantageous.

SUMMARY OF THE INVENTION

According to one aspect of the present disclosure, a closable door latch assembly for an egress/ingress door pivotable between an open position and a closed position includes an inner housing cover and an outer housing cover in juxtaposed relation with one another to define a housing, a rotatable inside door latch handle operably coupled with the housing, and a rotatable outside door latch handle operably coupled with the housing and the rotatable inside door latch handle. A latch plunger is moveable between an extended position and a retracted position, the latch plunger including a plunger leg having an inclined surface. A latch cam is operably coupled with each of the rotatable inside door latch handle and the rotatable outside door latch handle, and includes a crank arm slidably disposed against the inclined surface of the plunger leg. A biasing member mounted within the housing urges the latch plunger to an extended position, wherein rotation of either of the rotatable inside door latch handle or the rotatable outside door latch handle in a first direction rotates the crank arm of the latch cam and displaces the plunger leg of the latch plunger and the latch plunger to the retracted position against the urging of the biasing member.

According to another aspect of the present disclosure, a door assembly comprises an inner screen door detachable coupled with an exterior door, wherein each of the inner screen door and exterior door are pivotable between an open position and a closed position, the exterior door having a latch retention member disposed on an interior surface thereof. An inner screen door latch assembly includes a housing, a rotatable inside door latch handle operably coupled with the housing, and a rotatable outside door latch handle operably coupled with the housing and the rotatable inside door latch handle. A latch plunger is moveable between an extended position and a retracted position, the latch plunger further comprising a plunger leg having an inclined surface. A latch cam is operably coupled with each of the rotatable inside door latch handle and the rotatable outside door latch handle, the latch cam further comprising a crank arm slidably disposed against the inclined surface of the plunger leg. A biasing member is mounted within the housing urging the latch plunger to an extended position, wherein rotation of either of the rotatable inside door latch handle or the rotatable outside door latch handle in a first direction rotates the crank arm of the latch cam and displaces the plunger leg of the latch plunger and the latch plunger to the retracted position against the urging of the biasing member, and wherein when the inner screen door and the exterior door are in juxtaposed relation with one another, the latch retention member engages the outside door latch handle and rotates the outside door latch handle in the first direction and displaces the latch plunger to the retracted position.

According to a further aspect of the present disclosure, a door latch assembly comprises a housing, an inside and outside handle operably coupled with the housing, and a latch plunger. A latch cam is operably coupled with the inside and outside handles, and the latch cam further includes a crank arm slidably disposed against an inclined surface of a plunger leg operably coupled to the latch plunger. A biasing member urges the latch plunger to an extended position, wherein rotation of the inside or outside door latch handle in a first direction rotates the crank arm of the latch cam and displaces the plunger leg of the latch plunger and the latch plunger to a retracted position against the urging of the biasing member.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 3 is a perspective side view of the installed closable door latch assembly of the present disclosure from the exterior of the egress/ingress door;

FIG. 4 is a perspective side view of the installed closable door latch assembly of the present disclosure from the interior of the egress/ingress door;

FIG. 5 is an elevational side view of the installed closable door latch assembly of the present disclosure from the exterior of the egress/ingress door;

FIG. 6 is an elevational side view of the installed closable door latch assembly of the present disclosure from the interior of the egress/ingress door;

FIG. 10 is a perspective side view of the installed closable door latch assembly of the present disclosure from the exterior of the egress/ingress door, with the slidable panel in the first closed position;

FIG. 11 is a perspective side view of the installed closable door latch assembly of the present disclosure from the exterior of the egress/ingress door, with the slidable panel in the second open position;

DETAILED DESCRIPTION OF THE PREFERRED EMBODIMENT

Figure 2:
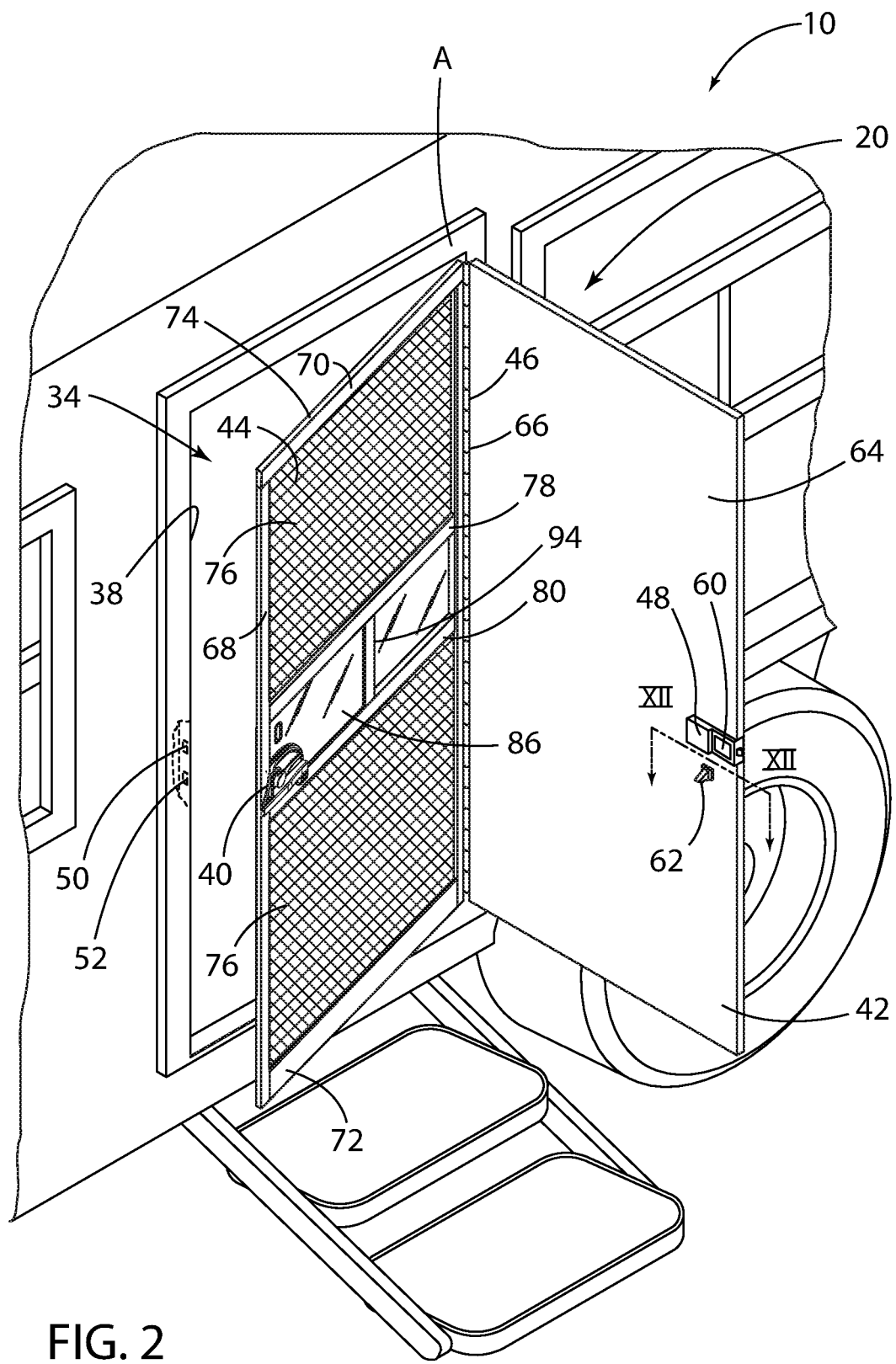
FIG. 2 is a perspective side view of the installed closable door latch assembly of the present disclosure from the exterior of the egress/ingress door and the interior surface of the exterior door.

For purposes of description herein, the terms "upper," "lower," "right," "left," "rear," "front," "vertical," "horizontal," "interior," "exterior," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
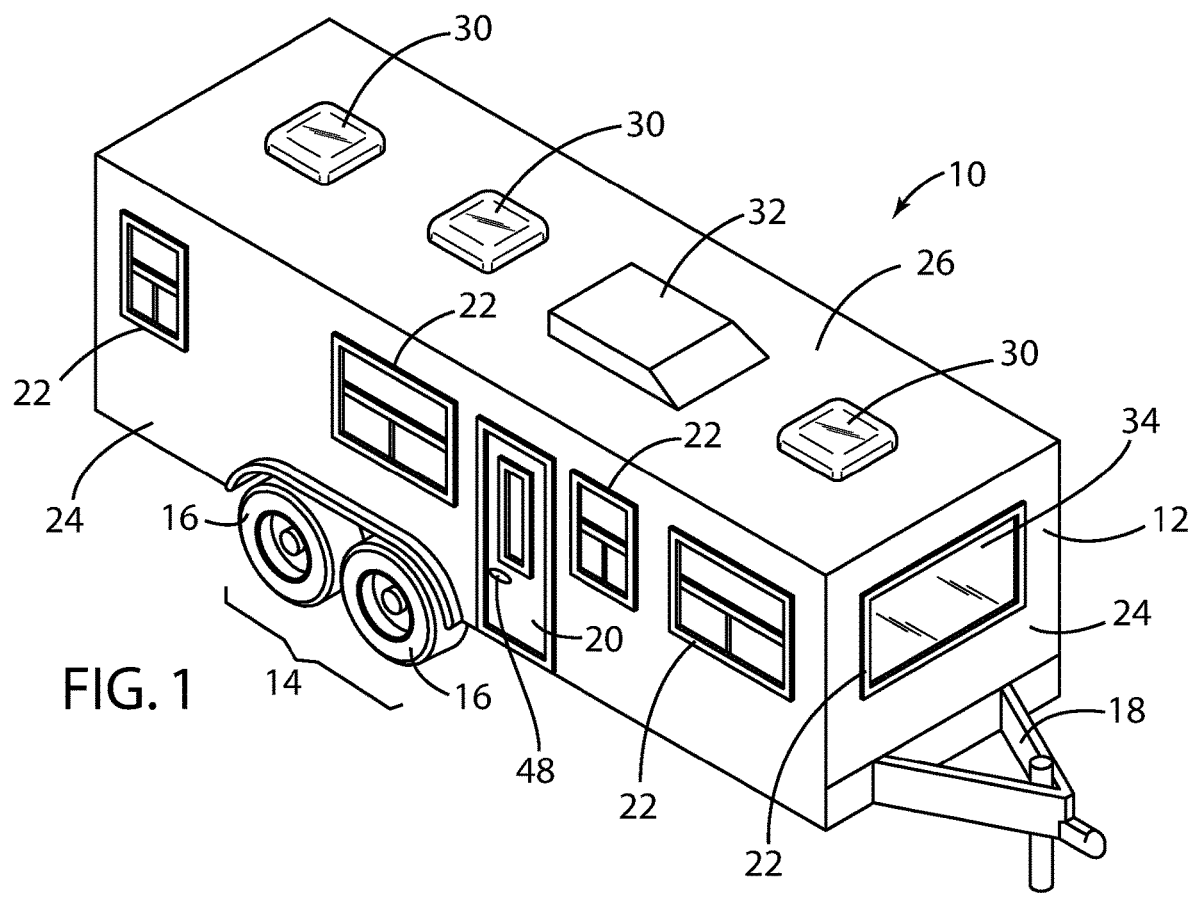
FIG. 1 is a front side perspective view of a recreational vehicle provided with a combination door assembly in accordance with the present disclosure.

Referring to FIG. 1, reference numeral 10 generally designates a recreational vehicle travel trailer particularly adapted for being towed by a motor vehicle (not shown). However, other recreational vehicle 10 configurations may advantageously employ the benefits of the present disclosure, such as and including motor coaches and so-called fifth wheel travel trailers. In the embodiment contemplated herein, the recreational vehicle 10 generally comprises a body 12 that is primarily supported by a pair of axles 14, each comprising at least one pair of opposing road wheels and an axle assembly 16, and a trailer tongue 18 by which the recreational vehicle 10 be attached to the tow vehicle. As is typical, the recreational vehicle 10 has a combination door assembly 20 for egress and ingress and a plurality of windows 22 arranged on sidewalls 24 of the body 12. A roof portion 26 is provided to enclose the body 12 and typically includes one or more ceiling vents 30, typically arranged along the longitudinal length of the recreational vehicle 10. Optionally, an air conditioning unit 32 can be mounted on the roof portion 26 as well.

The combination door assembly 20 shown in FIG. 2, to which the closable door latch assembly 40 of the present disclosure may be applied, is primarily installed to provide egress and ingress from and into the interior 34 of the body 12 of the recreational vehicle 10. That is, the combination door assembly 20 is typically operable between a closed position, in which the elements, such as the weather, are maintained outside of the interior 34 of the body 12 of the recreational vehicle 10, and an open position, by which egress and ingress may occur relative the interior 34 of the body 12 of the recreational vehicle 10. As shown in FIG. 2, the combination door assembly 20 primarily consists of an exterior door 42 and an inner screen door 44 mounted about and sharing a common set of hinges 46 that share a vertical hinge pivot axis on one side thereof. As shown in FIG. 2, each of the exterior door 42 and the inner screen door 44 may be pivotable, either separately or in combination, between an open position and a closed position. The exterior door 42 has a main latch assembly 48, and the inner screen door 44 has the aforementioned closable door latch assembly 40, each disposed on a side opposite the side having the hinges 46 proximate the hinge pivot axis. Each of the main latch assembly 48 and the closable door latch assembly 40 engage corresponding striker plates 50, 52 disposed on an interior surface of the inner doorjamb 38, respectively.

The exterior door 42 may be formed by a fiberglass clad exterior panel 54, a fiberglass clad interior panel 56, and a filler material 58 disposed between the fiberglass clad exterior and interior panels 54, 56. The filler material 58 may consist of a structural foam material that provides structural support, as well as high insulating qualities, at an extremely low weight. The main latch assembly 48 of the exterior door 42 may be provided with an exterior handle (not shown) and an interior handle 60, such as a paddle handle, for actuation of the exterior door 42. The exterior door 42 is also typically provided with a latch retention member 62 disposed on an interior surface 64 thereof, which may be provided to engage an exterior lever-type latch handle on the inner screen door 44, as referred to above, and as further explained below.

The inner screen door 44 may be constructed from a plurality of frame members 66, 68, 70, 72 that form a substantially rigid outer periphery 74 within which one or more screen panels 76 may be mounted. Preferably, the inner screen door 44 has a pair of opposed vertical side frame members 66, 68 extending the entire height of the inner screen door 44 and a pair of opposed horizontal transverse frame members 70, 72 at both the top and bottom of the inner screen door 44 that extends the width of the inner screen door 44. Even more preferably, a pair of horizontal cross-members 78, 80 is provided proximate the closable door latch assembly 40 of the inner screen door 44 to form an upper and lower screened portion, each of which may be constructed as a continuous screen panel 76. The pair of horizontal cross-members 78, 80 is preferably separated by a vertical distance and each is provided with a slot or groove 82 within an interior surface 84 thereof. Similarly, the portion of the vertical side frame members 66, 68 between the pair of horizontal cross-members 78, 80 is provided with a slot or groove 82 within an interior surface 84 thereof.

Preferably, the slot or groove 82 on the pair of horizontal cross-members 78, 80 receives a slidable panel 86 that may be slidably supported along a lower edge 88 thereof by the slot or groove 82 in the interior surface 84 of the lower of the pair of horizontal cross-members 78, 80 and slidably retained along an upper edge 90 thereof by the slot or groove 82 in the interior surface 84 of the upper of the pair of horizontal cross-members 78, 80, thereby operably coupling the slidable panel 86 with the pair of horizontal cross-members 78, 80. A stationary panel 92 is similarly mounted alongside and slightly offset from the slidable panel 86, whereby the slidable panel 86 may be moved between an open and closed position, as shown in FIGS. 10 and 11. Preferably, a sealing frame member 94 is disposed between the slidable panel 86 and the stationary panel 92. Similarly, a handle 96 may be provided at one end of the slidable panel 86 to facilitate its operation. While the slidable panel 86 shown in FIGS. 10 and 11 is substantially planar, it should be noted that slidable panel 86 having a concave or plastic slider bubble that allows access to the exterior door 42 can be employed.

As noted above, the closable door latch assembly 40 of the inner screen door 44 of the present disclosure benefits the consumer by allowing the consumer to open the inner screen door 44 from the interior 34 of the recreational vehicle 10 without having to slide the slidable panel 86, which may be particularly significant when the exterior door 42 is positioned in the open position. To this end, the closable door latch assembly 40 for the inner screen door 44 includes a housing 100 comprised of an inner housing cover 102 and an outer housing cover 104 in juxtaposed relation. Preferably, the inner housing cover 102 and the outer housing cover 104 are fabricated of glass-filled nylon. In order to provide consistent and reliable assembly of the housing 100, one or more bosses 106 may be disposed on an interior surface 108, 110 of either of the inner housing cover 102 or outer housing cover 104, respectively, and aligned corresponding female receivers (not shown) may be disposed on an interior surface 108, 110 of the other of the inner housing cover 102 or outer housing cover 104, as is known. The housing 100 further comprises a longitudinal and exterior groove 112 that receives and supports a shaped cutout edge 114 of the slidable panel 86 provided to accommodate the closable door latch assembly 40 of the inner screen door 44 when installed and allows the slidable panel 86 to entirely seal the vertical gap between the pair of horizontal cross-members 78, 80 when the slidable panel 86 is in the closed position.

In the embodiment shown in FIGS. 5-9, the housing 100 may be provided with a vertical flat edge 116 and a horizontal flat edge 118 that engage side frame member 68 and cross-member frame member 80, respectively. Preferably, each of the vertical flat edge 116 and the horizontal flat edge 118 of the housing 100 may include an elongated fin 120 that projects into and is fittingly received by the slot or groove 82 of side frame member 68 and the horizontal cross-member 80, respectively. This feature is particularly advantageous in that by the addition of the elongated fins 120, the closable door latch assembly 40 of the inner screen door 44 also improves the integrity of the inner screen door 44 by structurally reinforcing the vertical frame member 68 and horizontal cross-member 80 by having mounting points on the side frame member 68 and the horizontal cross-member 80 of the inner screen door 44. This feature also assists during the installation of the closable door latch assembly 40 in the proper alignment of the closable door latch assembly 40 relative the side frame member 68 and the horizontal cross-member 80 of the inner screen door 44. That is, the elongated fins 120 will always locate the closable door latch assembly 40 on the inner screen door 44 in the same location, which is important for properly locating the closable door latch assembly 40 relative the latch retention member 62 on the exterior door 42 and the striker plate 52 for the closable door latch assembly 40 on the inner door-jamb 38.

Even more preferably, the outer housing cover 104 further includes a forward mounting tab 122 and a lower mounting tab 124 that each overlays an exterior surface 126 of the one of the side frame member 68 and the horizontal cross-member 80, and a fastener 128 extending through each of the forward mounting tab 122 and the lower mounting tab 124 to fixedly attach the housing 100 to the inner screen door 44, as perhaps best shown in FIGS. 8-11. Thus, each of the forward mounting tab 122 and the lower mounting tab 124 may be fixedly attached to an exterior surface 126 of the inner screen door 44, as perhaps best shown in FIGS. 3, 5, 10, and 11. An additional beneficial feature of closable door latch assembly 40 of the present disclosure is that the manufacturer of the inner screen door 44 does not have to make any special fixtures or holes in the side frame member 68 and the horizontal cross-member 80 in order to properly install the closable door latch assembly 40. Rather, the closable door latch assembly 40 may be reliably situated in place and final installation can be accomplished merely through two fasteners 128, preferably self-tapping screws, installed through each of the forward mounting tab 122 and lower mounting tab 124.

A rotatable inside door latch handle 130 is operably coupled with the housing 100 from the interior side of the closable door latch assembly 40, and a rotatable outside door latch handle 132 is operably coupled with the housing 100 from the exterior of the closable door latch assembly 40. The rotatable inside door latch handle 130 is also operably coupled with the rotatable outside door latch handle 132. Each of the rotatable inside and outside door latch handles 130, 132 include a centroid portion 134 operably coupled with one another and the housing 100. In each, a handle arm 136 extends substantially radially outwardly from the centroid portion 134 of the door latch handles 130, 132, whereby rotation of the door latch handles 130, 132 relative the housing 100 can be obtained by applying a tangential force to the handle arm 136 relative the centroid portion 134 of the door latch handles 130, 132.

Figure 7:
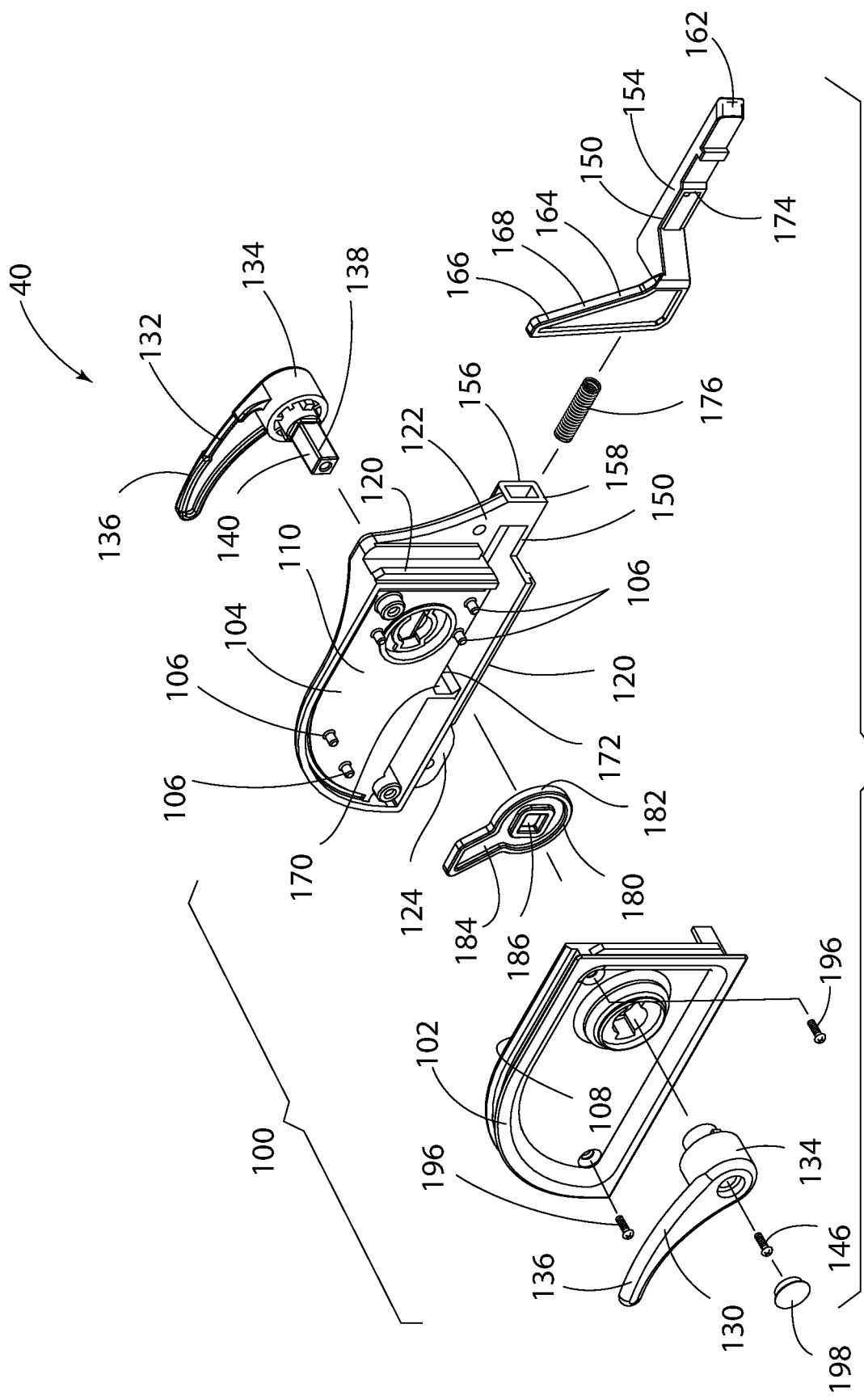
FIG. 7 is an exploded perspective view of the closable door latch assembly of the present disclosure.
Figure 8:
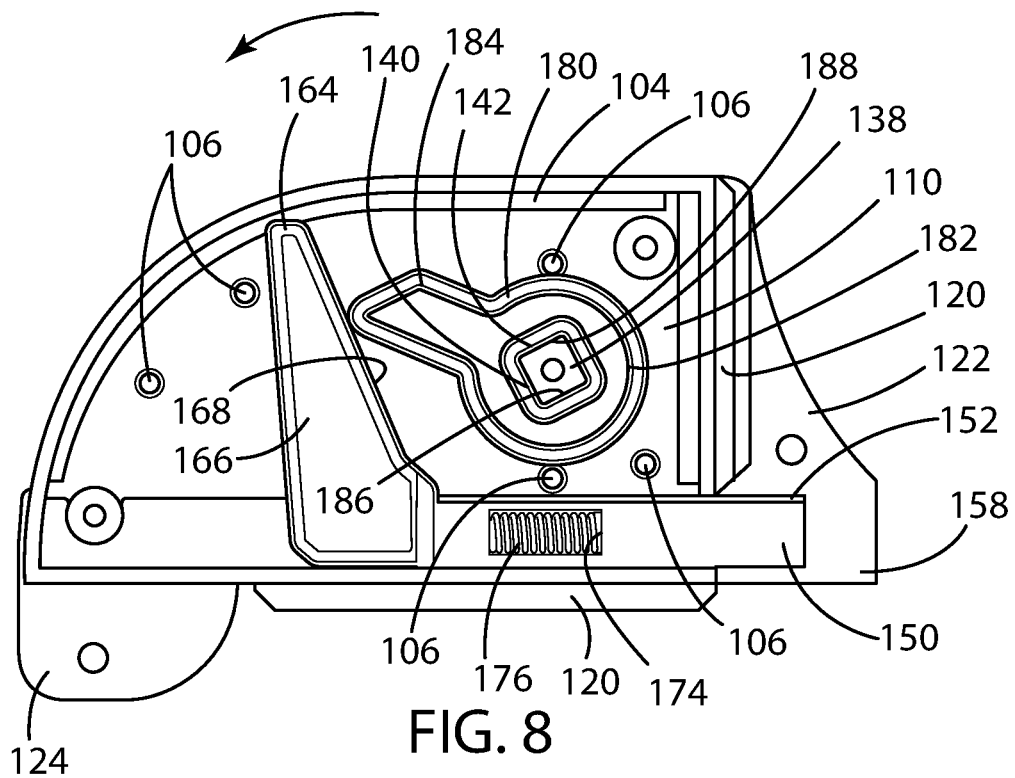
FIG. 8 is an elevational side view of the interior surface of the outer housing cover of the closable door latch assembly of the present disclosure with the latch plunger in the retracted position.
Figure 9:
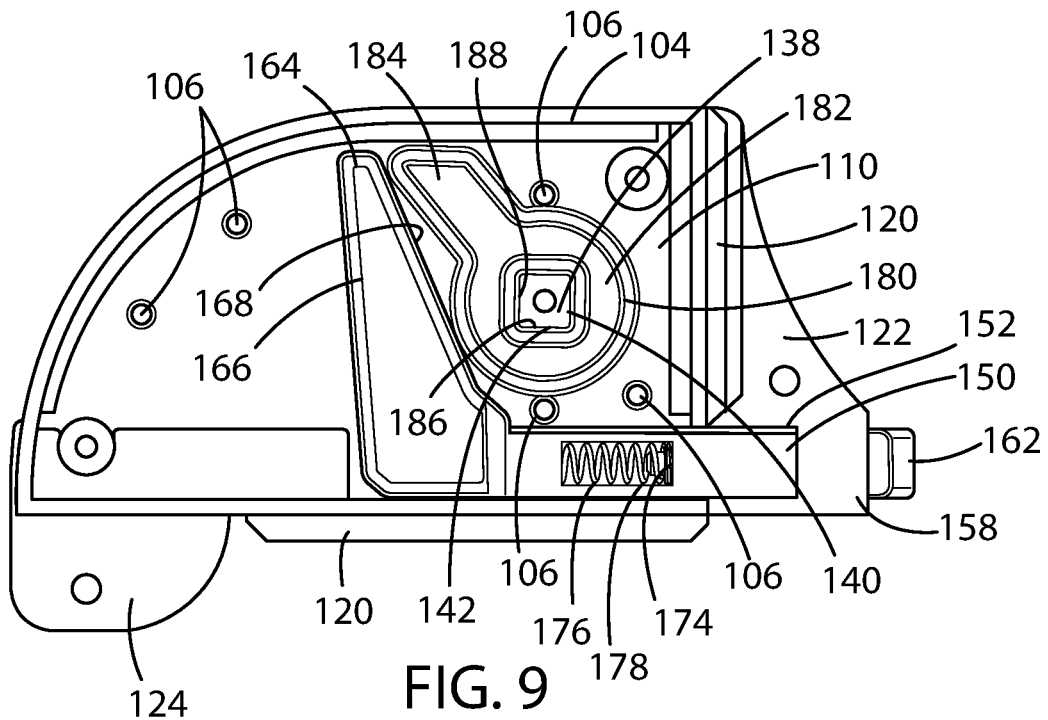
FIG. 9 is an elevational side view of the interior surface of the outer housing cover of the closable door latch assembly of the present disclosure with the latch plunger in the extended position.
Figure 12A:
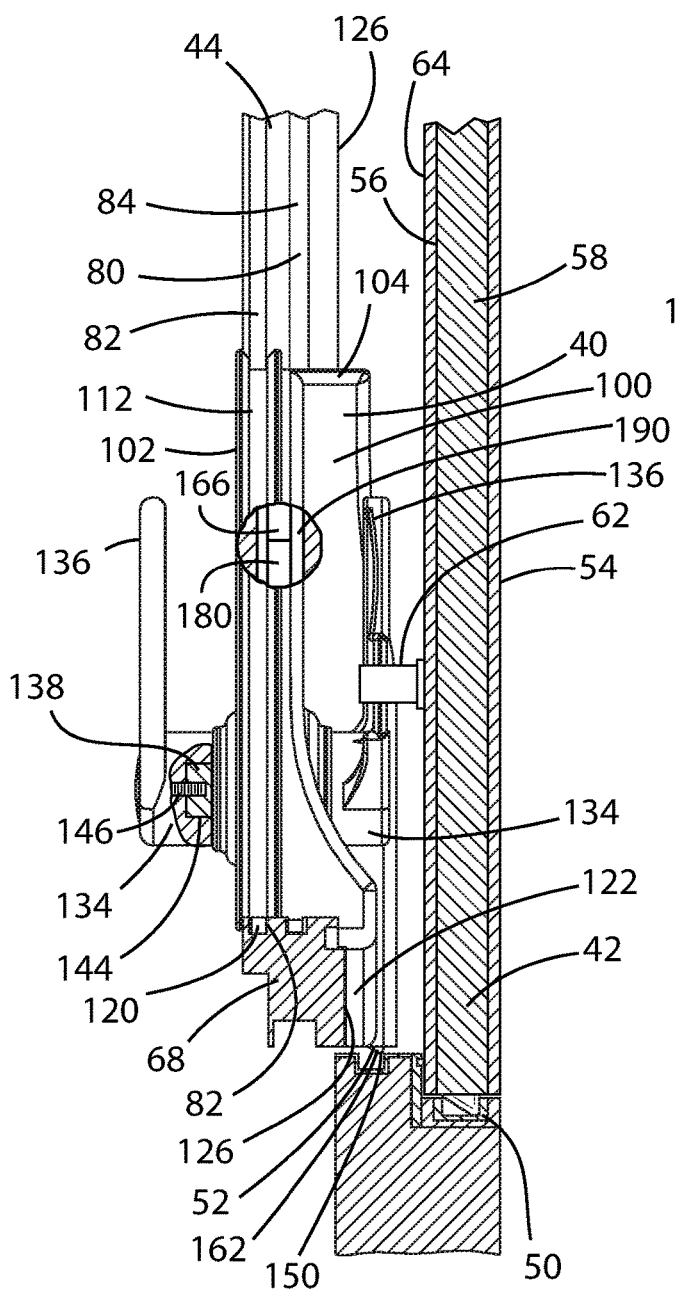
FIG. 12A is a top partial cross-sectional view of the installed closable door latch assembly of the present disclosure from the exterior of the egress/ingress door coupled with the interior surface of the exterior door, taken along the line XII-XII of FIG. 2.
Figure 12B:
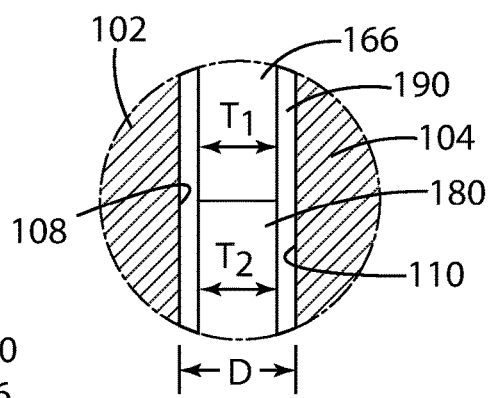
FIG. 12B is an enlarged cross-sectional view of a portion of FIG. 12A.
Figure 13:
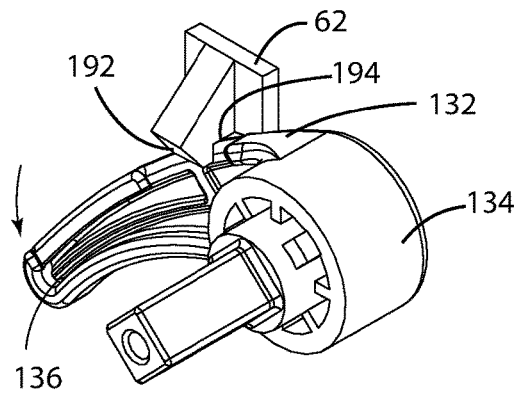
FIG. 13 is a perspective view of the outside latch handle and latch extension member of the present disclosure in the engaged position.

Preferably, the rotatable outside door latch handle 132 also includes a pivotable shaft 138 extending orthogonally from the centroid portion 134 of the rotatable outside door latch handle 132. An engaging surface 140 may be provided on an outer periphery 142 of the pivotable shaft 138 that is received within a corresponding central cavity 144 in the centroid portion 134 of the rotatable inside door latch handle 130. The pivotable shaft 138 of the rotatable outside door latch handle 132 may be mechanically coupled to the central cavity 144 within the centroid portion 134 of the rotatable inside door latch handle 130 by any well-known method, such as a threaded fastener 146 screw, as shown in FIG. 7. While it should be appreciated that a single engaging surface 140 on the pivotable shaft 138 may be sufficient, it is preferred that a plurality of engaging surface 140 is provided. Even more preferably, the pivotable shaft 138 of the rotatable outside door latch handle 132 and the central cavity 144 in the rotatable inside door latch handle 130 have a square-shaped outer periphery, as shown in FIGS. 7, 8, and 9.

A latch plunger 150, also preferably fabricated of glass-filled nylon, is moveable within the housing 100 between an extended position and a retracted position, wherein one of the inner housing cover 102 or outer housing cover 104 is further provided with an elongated recess 152. The latch plunger 150 is preferably slidably mounted within the elongated recess 152, which is even more preferably disposed on the interior surface 110 of the outer housing cover 104, as shown in FIGS. 7, 8, and 9. As seen in FIG. 7, the latch plunger 150 comprises a main body 154 received within the elongated recess 152 disposed within the outer housing cover 104. The elongated recess 152 is preferably provided with an opening 156 proximate a distal end 158 of the forward mounting tab 122, whereby the distal end 158 is essentially flush with an outer edge 160 of the vertical side frame member 68 of the inner screen door 44, through which a latch pawl 162 of the latch plunger 150 extends in the extended position. The latch plunger 150 also includes an offset portion 164 upon which a plunger leg 166 having an inclined surface 168 is mounted, such that the plunger leg 166 is disposed adjacent the interior surface 110 of the outer housing cover 104.

The elongated recess 152 preferably includes a first spring seat 170 at a first end 172 of the elongated recess 152, and the latch plunger 150 operably includes a second spring seat 174, whereby a biasing member 176 may be mounted within the housing 100 to urge the latch plunger 150 to be extended position. Preferably, the biasing member 176 comprises a compression spring disposed in axial alignment with the latch plunger 150 within the elongated recess 152, such that the compression spring 176 is disposed between the first spring seat 170 and the second spring seat 174. The second spring seat 174 preferably also includes an axial pin 178 that is received within the compression spring 176 to maintain the compression spring 176 in position throughout its range of motion.

The closable door latch assembly 40 further includes a latch cam 180 that is operably coupled with each of the rotatable inside door latch handle 130 and the rotatable outside door latch handle 132. The latch cam 180 is preferably disposed adjacent the interior surface 110 of the outer housing cover 104 and comprises a centroid portion 182 operably coupled with the rotatable inside door latch handle 130 and the rotatable outside door latch handle 132 for rotation of the centroid portion 182 of the latch cam 180 relative the housing 100. A crank arm 184 extends radially outwardly from the centroid portion 182 of the latch cam 180, wherein the crank arm 184 is slidably disposed against the inclined surface 168 of the plunger leg 166, as perhaps best shown in FIGS. 8 and 9.

The latch cam 180 also has an opening 186 provided therethrough with at least one engaging edge 188 that may be engaged by the engaging surface 140 of the pivotable shaft 138, thereby operably coupling each of the rotatable inside door latch handle 130 and the rotatable outside door latch handle 132 with the latch cam 180. Similar to the construction of the rotatable inside door latch handle 132 noted above, the opening 186 of the latch cam 180 and the outer periphery 142 of the pivotable shaft 138 each have a plurality of corresponding engaging edges 188 and engaging surfaces 140, respectively. Even more preferably, the opening 186 of the latch cam 180 and the outer periphery 142 of the pivotable shaft 138 are square. Accordingly, rotation of each of the rotatable inside door latch handle 130 or the rotatable outside door latch handle 132 in the first direction rotates the crank arm 184 of the latch cam 180 and displaces the plunger leg 166 of the latch plunger 150 and the latch pawl 162 to the retracted position against the urging of the compression spring 176.

Conversely, the compression spring 176 constantly provides a restorative force against the second spring seat 174 on the latch plunger 150, which, in turn, provides a restorative force to return the latch plunger 150 to the extended position. Compression spring 176 also provides a restorative force against the inclined surface 168 of the plunger leg 166 and upon the crank arm 184, which ultimately provides a restorative force on each of the rotatable inside door latch handle 130 and the rotatable outside door latch handle 132, thereby returning the rotatable inside door latch handle 130 and the rotatable outside door latch handle 132 to their normally latched position.

As the inner housing cover 102 and the outer housing cover 104 are in juxtaposed relation with one another, they together define a cavity 190 within the housing 100. Preferably, the cavity 190 has a predefined distance D between the interior surface 108 of the inner housing cover 102 and the interior surface 110 of the outer housing cover 104, and each of the plunger leg 166 and the latch cam 180 have a thickness $T_1$ and $T_2$, respectively, in the direction parallel to the axis of rotation of the latch cam 180 that is less than the predefined distance D. Even more preferably, in order to maintain the relative positions of the components inside the housing 100 during operation, together the plunger leg 166 and the latch cam 180 may have a combined thickness $T_1+T_2$ in the direction parallel to the axis of rotation of the latch cam 180 that is greater than one half of the predefined distance D.

As noted above, the exterior door 42 and the inner screen door 44 may be pivoted, either separately or in combination, between an open position and a closed position. A particularly beneficial feature of the closable door latch assembly 40 of the inner screen door 44 of the present disclosure is that when the exterior door 42 and the inner screen door 44 are operated separately, the inner screen door 44 may be opened from the interior 34 of the recreational vehicle 10 without having to slide the slidable panel 86 to its open position Conversely, when the exterior door 42 is coupled to the inner screen door 44 by of the latch retention member 62 disposed on an interior surface 64 thereof, the latch retention member 62 may engage the rotatable outside door latch handle 132 on the outside of the closable door latch assembly 40. For this purpose, the latch retention member 62 preferably includes an outwardly inclined surface 192 that pushes tangentially downward on the handle arm 136 of the rotatable outside door latch handle 132 as the exterior door 42 is brought into juxtaposed relation with the inner screen door 44, which rotates the outside door latch handle 132 in the first direction to displace the latch plunger 150 to the retracted position, against the urging of the compression spring 176, as noted above. A notch 194 on a lower portion of the latch retention member 62 engages the rotatable outside door latch handle 132 to retain the latch plunger 150 and the latch pawl 162 in the retracted position. The combination door assembly 20 may be then opened and closed as in a single unit, wherein the main latch assembly 48 of the exterior door 42 is solely relied upon to maintain the combination door assembly 20 in the closed and latched position. In effect, the inner screen door 44 becomes inoperative and merely opens and closes with the exterior door 42 is a component thereof.

The closable door latch assembly 40 the present disclosure provides an exceedingly simple and elegant solution to the drawbacks of the prior art inner screen doors 44 noted above. In particular, the closable door latch assembly 40 may be relatively quickly assembled, that is, by merely installing the various components within the outer housing cover 104 and enclosing the same with the inner housing cover 102, as noted above. Proper alignment is readily obtained through the bosses and female receivers internal to the housing 100. Assembly of the housing 100 of the closable door latch assembly 40 is obtained through the use of merely a pair of threaded fasteners 196, while the assembly of the rotatable inner and outer door latch handles 130, 132 is obtained through the use of yet another threaded fastener 146 covered by an end cap 198. The final assembly is thus very simple and obtained at a relatively low cost of construction.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A closable door latch assembly for an egress/ingress door pivotable between an open position and a closed position, the closable door latch assembly comprising:
   an inner housing cover and an outer housing cover in juxtaposed relation with one another to define a housing;
   a rotatable inside door latch handle operably coupled with the housing;
   a rotatable outside door latch handle operably coupled with the housing and the rotatable inside door latch handle;
   a latch plunger moveable between an extended position and a retracted position, the latch plunger further comprising a plunger leg having an inclined surface;
   a latch cam operably coupled with each of the rotatable inside door latch handle and the rotatable outside door latch handle, the latch cam further comprising a crank arm slidably disposed against the inclined surface of the plunger leg; and
   a biasing member mounted within the housing urging the latch plunger to an extended position;
   wherein rotation of either of the rotatable inside door latch handle or the rotatable outside door latch handle in a first direction rotates the crank arm of the latch cam and displaces the plunger leg of the latch plunger and the latch plunger to the retracted position against the urging of the biasing member; and
   wherein the latch plunger comprises a main body received within an elongated recess disposed within the outer housing cover, and the latch plunger further comprises an offset portion upon which the plunger leg is mounted such that the plunger leg is disposed adjacent an interior surface of the outer housing cover.

2. The closable door latch assembly of claim 1, wherein the latch plunger is slidably mounted within the elongated recess, the elongated recess being disposed on an interior surface of either of the inner housing cover or outer housing cover.

3. The closable door latch assembly of claim 2, wherein the outer housing cover further comprises the elongated recess, a forward mounting tab, and a lower mounting tab, and each of the forward mounting tab and the lower mounting tab is fixedly attached to an outer surface of a frame member of the egress/ingress door.

4. The closable door latch assembly of claim 2, wherein the biasing member comprises a compression spring disposed in axial alignment with the latch plunger within the elongated recess.

5. The closable door latch assembly of claim 4, wherein the elongated recess further comprises a first spring seat at a first end of the elongated recess and the latch plunger further comprises a second spring seat, wherein the compression spring is disposed between the first spring seat and the second spring seat.

6. The closable door latch assembly of claim 1, wherein the latch cam has an opening provided with at least one engaging edge and one of the rotatable inside door latch handle or the rotatable outside door latch handle has an engaging surface on an outer periphery of a pivotable shaft is operably coupled with the engaging edge of the opening of the latch cam.

7. The closable door latch assembly of claim 6, wherein the opening of the latch cam and the outer periphery of the pivotable shaft each have a plurality of corresponding engaging edges and engaging surfaces, respectively.

8. The closable door latch assembly of claim 7, wherein the opening of the latch cam and the outer periphery of the pivotable shaft is square.

9. The closable door latch assembly of claim 1, wherein the egress/ingress door has an upper or lower screened portion further comprising vertically disposed opposing side frame members and a horizontally disposed cross frame member; and
the housing comprises a vertical flat edge and a horizontal flat edge that engage one of the side frame members and the cross frame member, respectively.

10. The closable door latch assembly of claim 9, wherein each of the one of the opposing side frame members and the cross frame member further comprise a slot on an interior surface thereof, and
each of the vertical flat edge and the horizontal flat edge of the housing further comprises an elongated fin that projects into and is received by the slot of the one of the side frame member and the cross frame member, respectively.

11. The closable door latch assembly of claim 9, wherein the egress/ingress door comprises a slidable panel disposed proximate and operably coupled with the cross frame member.

12. The closable door latch assembly of claim 11, wherein the housing further comprises a longitudinal exterior groove that receives and supports an edge of the slidable panel.

13. The closable door latch assembly of claim 9, wherein the housing further comprises a forward mounting tab and a lower mounting tab, and each of the forward mounting tab and the lower mounting tab overlays an exterior surface of the one of the side frame member and cross frame member and a fastener extends through each of the forward mounting tab and the lower mounting tab to fixedly attach the housing to the egress/ingress door.

14. The closable door latch assembly of claim 1, further comprising bosses disposed on an interior surface of either of the inner housing cover or outer housing cover and aligned corresponding female receivers disposed on an interior surface of the other of the inner housing cover or the outer housing cover.

15. The closable door latch assembly of claim 1, wherein the elongated recess has an opening at one end through which a latch pawl of the latch plunger extends in the extended position.

16. The closable door latch assembly of claim 1, wherein the latch cam is disposed adjacent the interior surface of the outer housing cover and further comprises a centroid portion operably coupled with the rotatable inside door latch handle and the rotatable outside door latch handle for rotation of the centroid portion of the latch cam relative the housing and the crank arm extends radially outwardly from the centroid portion of the latch cam, whereby rotation of the latch cam relative the housing urges the crank arm against the inclined surface of the plunger leg of the latch plunger and displaces the latch plunger to the retracted position.

17. The closable door latch assembly of claim 16, wherein the inner housing cover and the outer housing cover in juxtaposed relation with one another define a cavity within the housing, the cavity having a predefined distance between an interior surface of the inner housing cover and the interior surface of the outer housing cover, and each of the plunger leg and the latch cam have a thickness in the direction parallel to the axis of rotation of the latch cam that is less than the predefined distance and together the plunger leg and the latch cam have a combined thickness in the direction parallel to the axis of rotation of the latch cam that is greater than one half of the predefined distance.

18. The door assembly of claim 1, further comprising an inner screen door having a pair of vertically disposed opposing side frame members and a horizontally disposed cross frame member; and
the housing comprises a vertical flat edge and a horizontal flat edge that engage one of the side frame members and the cross frame member, respectively.

19. The closable door latch assembly of claim 18, wherein the one of the opposing side frame members and the cross frame member further comprise a slot on an interior surface thereof, and
each of the vertical flat edge and the horizontal flat edge of the housing further comprises an elongated fin that projects into and is received by the slot of the one of the side frame member and the cross frame member, respectively.

20. The closable door latch assembly of claim 19, wherein the inner screen door comprises a slidable panel disposed proximate and operably coupled with the cross frame member.

21. A closable door latch assembly for an egress/ingress door pivotable between an open position and a closed position, the closable door latch assembly comprising:
an inner housing cover and an outer housing cover in juxtaposed relation with one another to define a housing;
a rotatable inside door latch handle operably coupled with the housing;
a rotatable outside door latch handle operably coupled with the housing and the rotatable inside door latch handle;
a latch plunger moveable between an extended position and a retracted position within an elongated recess, the latch plunger further comprising a plunger leg extending outside of the elongated recess, the plunger leg further comprising and inclined surface;
a latch cam operably coupled with each of the rotatable inside door latch handle and the rotatable outside door latch handle, the latch cam further comprising a crank arm slidably disposed against the inclined surface of the plunger leg; and a biasing member mounted within the housing urging the latch plunger to an extended position;

wherein rotation of either of the rotatable inside door latch handle or the rotatable outside door latch handle in a first direction rotates the crank arm of the latch cam and displaces the plunger leg of the latch plunger and the latch plunger to the retracted position against the urging of the biasing member; and wherein the latch plunger comprises a main body received within the elongated recess disposed within the outer housing cover, and the latch plunger further comprises an offset portion upon which the plunger leg is mounted such that the plunger leg is disposed adjacent an interior surface of the outer housing cover.

* * * * *